United States Patent
Kim et al.

(10) Patent No.: US 8,605,888 B2
(45) Date of Patent: Dec. 10, 2013

(54) METHOD FOR MAKING STATUS FUNCTION MATRIX AND METHOD FOR CONTROLLING CALL CONNECTION USING IT

(75) Inventors: Jeong-Ha Kim, Daejeon (KR); Kyung-Soo Kim, Daejeon (KR)

(73) Assignees: Samsung Electronics Co., Ltd., Suwon-si (KR); Electronics and Telecommunication Research Institute, Daejeon (KR)

( * ) Notice: Subject to any disclaimer, the term of this patent is extended or adjusted under 35 U.S.C. 154(b) by 811 days.

(21) Appl. No.: 11/861,972

(22) Filed: Sep. 26, 2007

(65) Prior Publication Data

US 2008/0133778 A1 Jun. 5, 2008

(30) Foreign Application Priority Data

Dec. 1, 2006 (KR) .................. 10-2006-0120815
Feb. 2, 2007 (KR) .................. 10-2007-0010954

(51) Int. Cl.
*H04W 4/00* (2009.01)
(52) U.S. Cl.
USPC ....................................... 379/329; 455/422.1
(58) Field of Classification Search
USPC .................. 370/329; 455/411, 426.1, 445
See application file for complete search history.

(56) References Cited

U.S. PATENT DOCUMENTS

| 5,625,870 A | * | 4/1997 | Moon ............................ 455/411 |
| 5,812,951 A | * | 9/1998 | Ganesan et al. .............. 455/445 |
| 5,995,831 A | * | 11/1999 | Gulliford et al. .......... 455/426.1 |
| 2008/0270101 A1 | * | 10/2008 | Salmela ......................... 703/17 |

FOREIGN PATENT DOCUMENTS

| KR | 10-1998-0073786 A | 11/1998 |
| KR | 10-2000-0037608 A | 7/2000 |
| KR | 10-2002-0068732 A | 8/2002 |

* cited by examiner

*Primary Examiner* — Robert Wilson
*Assistant Examiner* — Lionel Preval
(74) *Attorney, Agent, or Firm* — Jefferson IP Law, LLP

(57) ABSTRACT

The present invention relates to a call connection control method used by defining a state function matrix when a base station controls call connection of a terminal, and a method for generating the state function matrix. In a call connection process, a call state varies and an access point control subsystem receives messages from a terminal and an access point traffic subsystem. The access point control subsystem calls a state function corresponding to the received message and a current call state among a plurality of state functions that are respectively mapped to a plurality of elements of the state function matrix when receiving the message, and operates the state function. The state function matrix may include a plurality of call states as one index among row and column indexes, and a plurality of messages as the other index.

10 Claims, 3 Drawing Sheets

|  | 1 | 2 | 3 | 4 | 5 | 6 | 7 | n |
|---|---|---|---|---|---|---|---|---|
|  | RNG-REQ | RNG-Complete | SBC-REQ | SBC-Complete | REG-REQ | REG-Complete | CREGrsp | Timer-Expiry |
| S1 | fnRNG-REQ | fnUnexpectedMsg | fnUnexpectedMsg | fnUnexpectedMsg | fnUnexpectedMsg | fnUnexpectedMsg | fnUnexpectedMsg | fnUnexpectedMsg |
| S2 | fnUnexpectedMsg | fnRNG-Complete | fnUnexpectedMsg | fnUnexpectedMsg | fnUnexpectedMsg | fnUnexpectedMsg | fnUnexpectedMsg | fmS2TimerExpiry |
| S3 | fnUnexpectedMsg | fnUnexpectedMsg | fnSBC-REQ | fnUnexpectedMsg | fnUnexpectedMsg | fnUnexpectedMsg | fnUnexpectedMsg | fmS3TimerExpiry |
| S4 | fnUnexpectedMsg | fnUnexpectedMsg | fnUnexpectedMsg | fnSBC-Complete | fnUnexpectedMsg | fnUnexpectedMsg | fnUnexpectedMsg | fmS4TimerExpiry |
| S5 | fnUnexpectedMsg | fnUnexpectedMsg | fnUnexpectedMsg | fnUnexpectedMsg | fnREG-REQ | fnUnexpectedMsg | fnUnexpectedMsg | fmS5TimerExpiry |
| S6 | fnUnexpectedMsg | fnUnexpectedMsg | fnUnexpectedMsg | fnUnexpectedMsg | fnUnexpectedMsg | fnREG-Complete | fnUnexpectedMsg | fmS6TimerExpiry |
| S7 | fnUnexpectedMsg | fnUnexpectedMsg | fnUnexpectedMsg | fnUnexpectedMsg | fnUnexpectedMsg | fnUnexpectedMsg | fnREGrsp | fmS7TimerExpiry |

FIG. 3

|    | 1 RNG-REQ | 2 RNG-Complete | 3 SBC-REQ | 4 SBC-Complete | 5 REG-REQ | 6 REG-Complete | 7 CREGrsp | ... | n Timer-Expiry |
|----|-----------|----------------|-----------|----------------|-----------|----------------|-----------|-----|----------------|
| S1 | fnRNG-REQ | fnUnexpectedMsg | fnUnexpectedMsg | fnUnexpectedMsg | fnUnexpectedMsg | fnUnexpectedMsg | fnUnexpectedMsg | | fnUnexpectedMsg |
| S2 | fnUnexpectedMsg | fnRNG-Complete | fnUnexpectedMsg | fnUnexpectedMsg | fnUnexpectedMsg | fnUnexpectedMsg | fnUnexpectedMsg | | fmS2TimerExpiry |
| S3 | fnUnexpectedMsg | fnUnexpectedMsg | fnSBC-REQ | fnUnexpectedMsg | fnUnexpectedMsg | fnUnexpectedMsg | fnUnexpectedMsg | | fmS3TimerExpiry |
| S4 | fnUnexpectedMsg | fnUnexpectedMsg | fnUnexpectedMsg | fnSBC-Complete | fnUnexpectedMsg | fnUnexpectedMsg | fnUnexpectedMsg | | fmS4TimerExpiry |
| S5 | fnUnexpectedMsg | fnUnexpectedMsg | fnUnexpectedMsg | fnUnexpectedMsg | fnREG-REQ | fnUnexpectedMsg | fnUnexpectedMsg | | fmS5TimerExpiry |
| S6 | fnUnexpectedMsg | fnUnexpectedMsg | fnUnexpectedMsg | fnUnexpectedMsg | fnUnexpectedMsg | fnREG-Complete | fnUnexpectedMsg | | fmS6TimerExpiry |
| S7 | fnUnexpectedMsg | fnUnexpectedMsg | fnUnexpectedMsg | fnUnexpectedMsg | fnUnexpectedMsg | fnUnexpectedMsg | fnREGrsp | | fmS7TimerExpiry |

METHOD FOR MAKING STATUS FUNCTION MATRIX AND METHOD FOR CONTROLLING CALL CONNECTION USING IT

CROSS-REFERENCE TO RELATED APPLICATION

This application claims priority to and the benefit of Korean Patent Application No. 10-2006-0120815 filed in the Korean Intellectual Property Office on Dec. 1, 2006, and 10-2007-0010954 filed in the Korean Intellectual Property Office on Feb. 2, 2007, the entire contents of which are incorporated herein by reference.

BACKGROUND OF THE INVENTION (a) Field of the Invention

The present invention relates to a call connection control method of a base station, and more particularly, to a call connection control method using a state function matrix.

(b) Description of the Related Art

A portable Internet system among communication systems is a 3.5 generation mobile communication system using a wireless transmission method that guarantees spectrum usage efficiency in a 2.3 GHz frequency bandwidth so as to provide various types of Internet protocol (IP)-based services (e.g., streaming video, file transfer protocol (FTP), e-mail, and chatting) provided in a wired Internet and to transmit data packet at a high speed. The portable Internet system transmits and receives data for each frame to support high speed data packet transmission in a wireless link, and uses orthogonal frequency division multiplexing (OFDM), frequency division multiple access (FDMA), and time division duplexing (TDD) wireless transmission methods.

Generally, in most of the communication systems including the portable Internet system, when a terminal performs call connection, a base station uses logic structure including an if-then-else or a case command statement to determine a current call state and a received message, and performs a state function required according to a determination result. However, the base station using the logic structure usually performs a determination process of "a number of entire states/2+a number of entire received messages/2", which causes waste of central processing unit (CPU) resources and deteriorates system performance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a call connection control method for improving call connection control performance.

According to an exemplary embodiment of the present invention, in a call connection control method of a base station, a message is received, a state function corresponding to the received message and a current call state is called among a plurality of state functions that are mapped to a plurality of elements of a state function matrix, and the called state function is operated.

Here, the state function matrix includes a plurality of call states as one index among row and column indexes, and a plurality of messages as the other index.

According to another exemplary embodiment of the present invention, in a method of making state function matrix used for call connection control of a base station, a plurality of call states are established as one index among row and column indexes of a state function matrix, a plurality of messages are established as the other index, and an element of the state function matrix corresponding to a call state among the plurality of call states and a message among the plurality of messages is established to be a state function operated when receiving the message among the plurality of messages in the call state among the plurality of call states.

BRIEF DESCRIPTION OF THE DRAWINGS

FIG. 3 is a diagram representing a state function matrix used in the call connection control method according to the exemplary embodiment of the present invention.

DETAILED DESCRIPTION OF THE EMBODIMENTS

Figure 1:
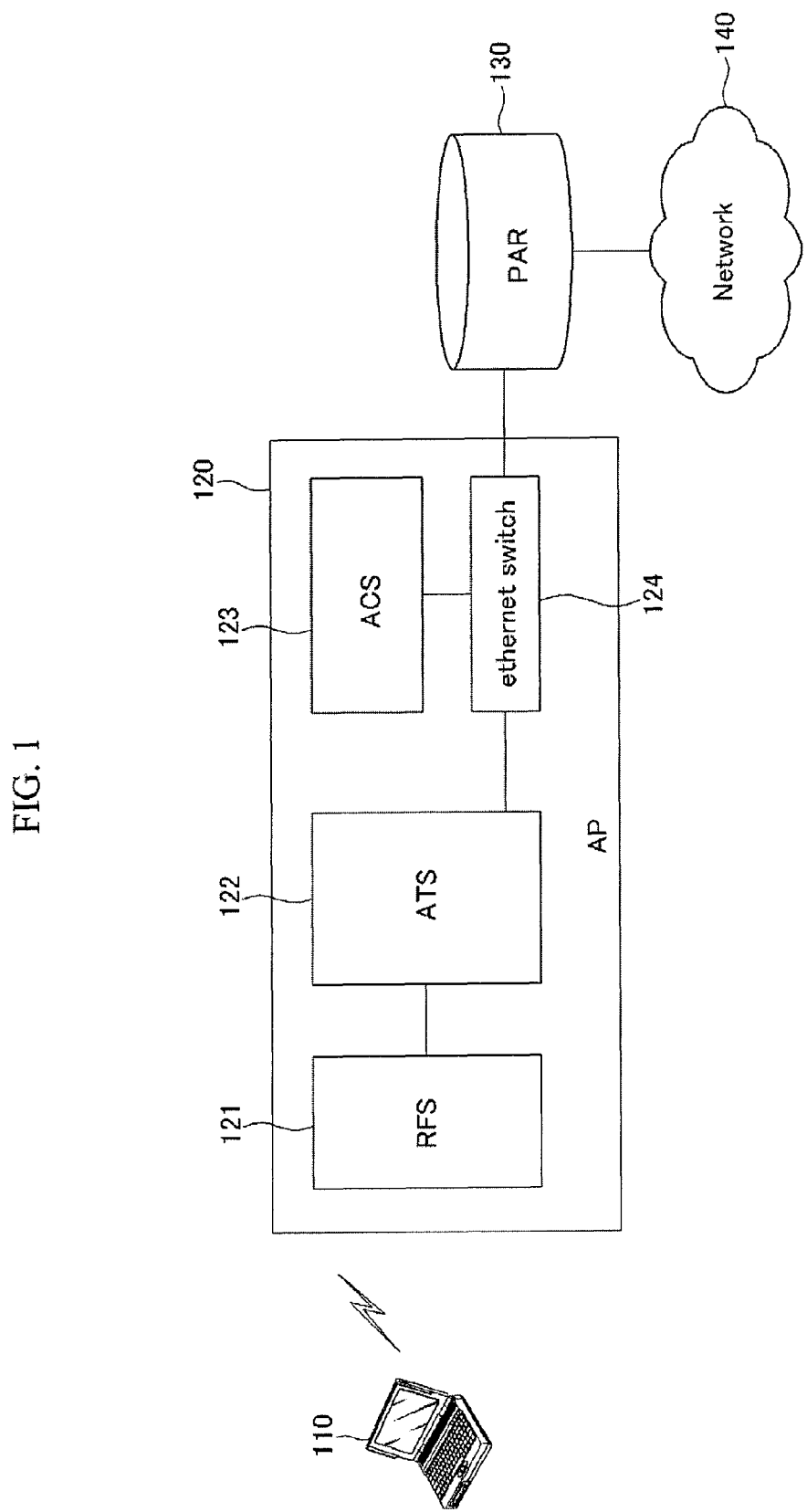
FIG. 1 is a schematic diagram of a communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements.

A method for controlling call connection of a communication system according to an exemplary embodiment of the present invention will be described with reference to the figures.

FIG. 1 is a schematic diagram of a communication system according to the exemplary embodiment of the present invention. In the exemplary embodiment of the present invention, a portable Internet system based on an IEEE 802.16 wireless metropolitan area network (MAN) will be exemplified, but it is not limited thereto, and another communication system may be applied.

As shown in FIG. 1, the communication system according to the exemplary embodiment of the present invention includes an access terminal (AT) 110, an access point (AP) 120, a packet access router (PAR) 130, and a network 140.

The AP 120 controls an access of the AT 110, performs a packet match operation between a wired link and a wireless link, performs a wireless transmitting/receiving control operation, and manages wireless bands. In addition, the AP 120 includes a radio frequency subsystem (RFS) 121, an access point traffic subsystem (ATS) 122, an access point control subsystem (ACS) 123, and an ethernet switch 124. The AP 120 functions as a base station of the communication system.

The RFS 121 transmits and receives data in the wireless link. The ATS 122 processes traffic, performs packet scheduling, controls the wireless link, manages radio resources, performs packet match between the wired link and the wireless link, and performs a hybrid automatic repeat request (HARQ) control operation. That is, the ATS 122 receives cell information and user connection information from the ACS 123 to process the traffic and perform the packet scheduling, and transmits a scheduled downlink data combination to the RFS 121 to request wireless link transmission or processes a received uplink data combination to transmit it to the PAR 130. The ACS 123 controls protocol operations for controlling the AP 120 and the AT 110, and controls connection of call from the AT 110.

The PAR 130 accesses the AP 120 and the network 140, and controls authentication, dynamic host configuration protocol (DHCP), mobile Internet protocol (MIP), handover between ATs, and handover between PARs. The network 140 may be an Internet protocol (IP)-based wired core network.

The method for controlling call connection in the AP 120 according to the exemplary embodiment of the present invention will now be described with reference to FIG. 2 and FIG. 3.

Figure 2:
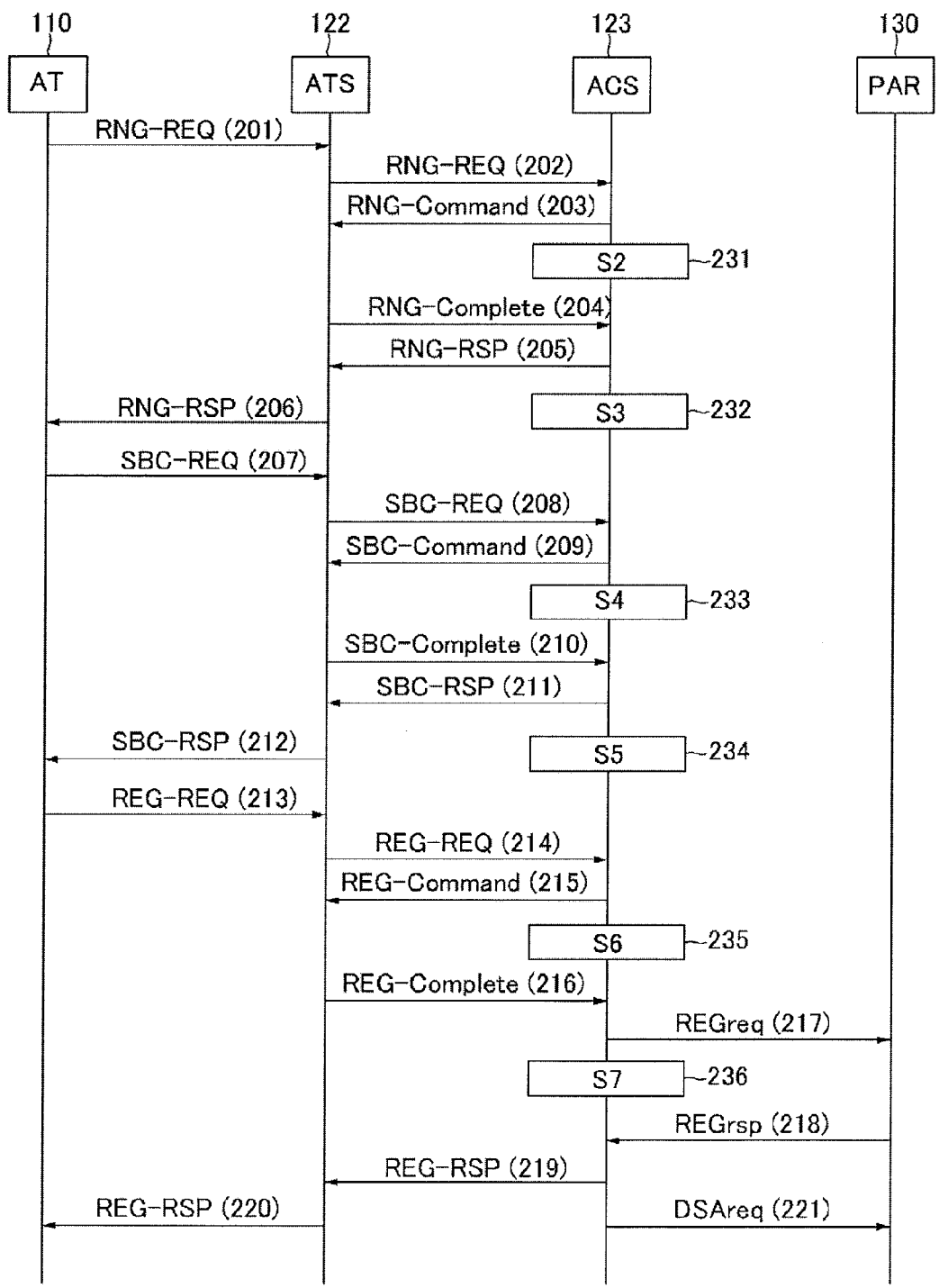
FIG. 2 is a flowchart representing a call connection control method according to the exemplary embodiment of the present invention.

FIG. 2 is a flowchart representing a call connection control method according to the exemplary embodiment of the present invention.

Firstly, call states varying in a call connection process according to the exemplary embodiment of the present invention will be described.

As shown in FIG. 2, there are seven call states from S1 to S7 in a call connection process from an initial ranging state and a terminal registration state.

A state S1 is an idle state in which the ACS 123 waits to receive a ranging request message (RNG-REQ) from the AT 110. In a state S2, the ACS 123 waits to receive a ranging complete message (RNG-Complete) from the ATS 122. In a state S3, a ranging process is finished, and the ACS 123 waits to receive a subscriber station basic capability request message (SBC-REQ) from the AT 110. In a state S4, the ACS 123 waits to receive a subscriber station basic capability complete message (SBC-Complete) from the ATS 122. In a state S5, the subscriber station basic capability request message (SBC-REQ) and the subscriber station basic capability complete message (SBC-Complete) have been received, and the ACS 123 waits to receive a registration request message (REG-REQ) from AT 110. In a state S6, the ACS 123 waits to receive a registration complete message (REG-Complete) from the ATS 122. In a state S7, the ACS 123 waits to receive a registration response message (REGrsp) from the PAR 130.

A method for controlling call connection in the AP 120 shown in FIG. 1 and a method for varying a call state according to the controlling call connection will now be described.

In the state S1, when the ACS 123 receives the RNG-REQ message for requesting initial ranging from the AT 110 through the ATS 122 in steps 201 and 202, the ACS 123 calls a function fnRNG-REQ. When the function fnRNG-REQ is operated, the ACS 123 transmits a ranging command message (RNG-Command) for requesting initial setting of ranging information to the ATS 122 in step 203, a call state is changed to the state S2 for waiting for an RNG-Complete message from the ATS 122 in step 231, and a first sensing timer of the state S2 is operated. The ACS 123 measures a time by the first sensing timer after a call state is changed to the state S2, and performs a function fnS2TimerExpirey when the ACS 123 does not receive a RNG-Complete message before a predetermined time of the first sensing timer expires.

The ATS 122 finishes the initial setting of the ranging information, and transmits the RNG-Complete message to the ACS 123. In the state S2, when receiving the RNG-Complete message from the ATS 122 in step 204, the ACS 123 calls a function fnRNG-Complete. When the function fnRNG-Complete is operated, the ACS 123 forms a ranging response message (RNG-RSP) to transmit it to the AT 110 in steps 205 and 206, a call state is changed to the state S3 for waiting for the SBC-REQ message from the AT 110 in step 232, and a second sensing timer of the state S3 is operated. The ACS 123 measures a time by the second sensing timer after the call state is changed, and performs a function fnS3TimerExpirey when the ACS 123 does not receive the SBC-REQ message before a predetermined time of the second sensing timer expires.

In the state S3, when receiving the SBC-REQ message from the AT 110 through the ATS 122 in steps 207 and 208, the ACS 123 calls a function fnSBC-REQ. When the function fnSBC-REQ is operated, the ACS 123 transmits a subscriber station basic capability command message (SBC-Command) for requesting setting of subscriber station basic capability information to the ATS 122 in step 209, a call state is changed to the state S4 for waiting for the SBC-Complete message from the ATS 122 in step 233, and a third sensing timer of the state S4 is operated. The ACS 123 measures a time by the third sending timer after the call state is changed to the sensing timer, and performs a function fnS4TimerExpirey when the ACS 123 does not receive the SBC-Complete message before a predetermined time of the third sensing timer expires.

The ATS 122 finishes the setting of the subscriber station basic capability information, and transmits the SBC-Complete message to the ACS 123. In the state S4, when receiving the SBC-Complete message from the ATS 122 in step 210, the ACS 123 calls a function fnSBC-Complete. When the function fnSBC-Complete is operated, the ACS 123 forms a subscriber station basic capability response message (SBC-RSP) for confirming the setting of the subscriber station basic capability information to transmit it to the AT 110 in steps 211 and 212, a call state is changed to the state S5 for waiting for the REG-REQ message from the AT 110 in step 234, and a fourth sensing timer of the state S5 is operated. The ACS 123 measures a time after a state is changed to S5 by the fourth sensing timer, and performs a function fnS5TimerExpirey when the ACS 123 does not receive the REG-REQ message before a predetermined time of the fourth sensing timer expires.

In the state S5, when receiving the REG-REQ message from the AT 110 through the ATS 122 in steps 213 and 214, the ACS 123 calls a function fnREG-REQ. When the function fnREG-REQ is operated, the ACS 123 transmits a registration command message (REG-Command) for requesting setting of terminal registration to the ATS 122 in step 215, a call state is changed to the state S6 for waiting for the REG-Complete message from the ATS 122, and a fifth sensing timer of the state S6 is operated. The ACS 123 measures a time after the state is changed to S6 by the fifth sensing timer, and a function fnS6TimerExpirey is operated when the ACS 123 does not receive the REG-Complete message before a predetermined time of the fifth sensing timer expires.

The ATS 122 finishes the setting of the terminal registration, and transmits the REG-Complete message to the ACS 123. In the state S6, when receiving the REG-Complete message from the ATS 122 in step 216, the ACS 123 calls a function fnREG-Complete. When the function fnREG-Complete is operated, the ACS 123 forms a registration request message (REGreq) for requesting the setting of the terminal registration to transmit it to the PAR 130 in step 217, a call state is changed to the state S7 for waiting for the REGrsp message from the PAR 130 in step 236, and a sixth sensing timer of the state S7 is operated. The ACS 123 measures a time after the state is changed to S7 by the sixth sensing timer, and performs a function fnS7TimerExpirey when the ACS 123 does not receive the REGrsp message before a predetermined time of the sixth sensing timer expires.

In the state S7, when receiving the REGrsp message from the PAR 130 in step 218, the ACS 123 calls a function fnREGrsp. When the function fnREGrsp is operated, the ACS 123 forms a registration response message (REG-RSP) for determining registration of the subscriber station to transmit it to the AT 110 in steps 219 and 220, transmits a dynamic service addition request message (DSAreq) to the PAR 130 to start management connection setting for Internet protocol (IP) allocation in step 221, and the call state is changed to a state for waiting for a response thereof.

As described, when receiving a message, the ACS 123 of the AP 120 calls a state function corresponding to a current call state and the received message, and operates the state function. In this case, if the ACS 123 uses logic structures including if-then-else and case sentences to sequentially check the current call state and the received message and to find the corresponding state function, a number "the number of all states/2+the number of all received messages/2" of checking processes is performed, and therefore resources are wasted. A method for finding a state function corresponding to a current call state and a received message without resource waste will be described with reference to FIG. 3.

FIG. 3 is a diagram representing a state function matrix used in the call connection control method according to the exemplary embodiment of the present invention.

As shown in FIG. 3, in the state function matrix for the call connection control, rows are call states in the call connection process and columns are messages that may be received by the ACS 123. Accordingly, according to the exemplary embodiment of the present invention, as shown in FIG. 3, the state function matrix includes 7 rows from the state S1 to the state S7 and n columns from the RNG-REQ to a Time-Expiry message. The Time-Expiry message is used when a desired message is not received before a predetermined time expires in a current call state. Differing from FIG. 3, it may be established that columns are the call states and rows are the messages.

An element corresponding to an $i^{th}$ row and a $j^{th}$ column in the state function matrix is a state function operated when the ACS 123 receives a message j in a state i.

When receiving the message j in the state i, the ACS 123 operates a state function determined in an $i^{th}$ row and a $j^{th}$ column in the state function matrix, and performs a corresponding process for the call connection. That is, the ACS 123 may directly find a state function that is an element corresponding to a column j corresponding to a received message and a row i corresponding to a current call state from the state function matrix.

The state functions include state functions operated when receiving a normal message in the current call state, and state functions operated when receiving an abnormal message in the current call state. In the state functions operated when receiving the normal message in the current call state, received message validity check, resource management, transmission message configuration, state change, and sensing timer operation of the changed call state are performed. The state functions operated when receiving the normal message includes fnRNG-REQ, fnRNG-Complete, fnSBC-REQ, fnSBC-Complete, fnREG-REQ, fnREG-Complete, and fnREGrsp functions.

The fnRNG-REQ function is operated when the ACS 123 receives the RNG-REQ message in the state S1, the fnRNG-Complete function is operated when the ACS 123 receives the RNG-Complete message 203 shown in FIG. 2 in the state S2, the fnSBC-REQ function is operated when the ACS 123 receives the SBC-REQ message in the state S3, the fnSBC-Complete function is operated when the ACS 123 receives the SBC-Complete message in the state S4, the fnREG-REQ function is operated when the ACS 123 receives the REG-REQ message in the state S5, the fnREG-Complete function is operated when the ACS 123 receives the REG-Complete message in the state S6, and the fnREGrsp function is operated when the ACS 123 receives the REGrsp message in the state S7.

The state functions operated when receiving the abnormal message includes fnUnexpectedMsg and fnSiTimerExpiry functions.

The fnUnexpectedMsg function is operated when receiving a message that is not expected in the current call state, and the fnSiTimerExpiry function is operated when an expected message is not received before a predetermined time expires in the state i.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since a base station uses a two dimensional state function matrix having state functions as elements rather than using the if-then-else and case sentences when performing call connection control of a terminal, a call connection control processing speed may be increased.

In addition, since call states and received messages are used as indexes of a state function matrix and a state function corresponding to the call state and the received message is performed, call control processing performance at the base station may be increased.

Further, since the state function is maintained to be the two dimensional function matrix, the state function may be easily added, deleted, and modified.

What is claimed is:
1. A method for controlling call connection in a base station, the method comprising:
 receiving a message;
 calling a state function, at a control subsystem, corresponding to the received message and a current call state among a plurality of state functions that are mapped to a plurality of elements of a state function matrix, wherein the state function matrix includes a plurality of call states as one index among row and column indexes, and a plurality of messages as the other index; and
 operating the called state function at the control subsystem,
 wherein the state function matrix includes a plurality of first state functions that are operated when receiving a message that is appropriate for a current call state and a plurality of second state functions that are operated when receiving no message that is appropriate for the current call state,
 wherein the plurality of messages of the state function matrix includes a plurality of call connection messages and a message indicating non-receipt of a call connection message within a period of time, and wherein the second state functions includes at least one of a function that is operated when a message that is not expected in the current call state and a function that is operated when an expected message is not received before a predetermined time expires.

2. The method of claim 1, wherein the plurality of messages of the state function matrix include at least one message among a ranging request message, a subscriber station basic capability request message, a registration request message, a ranging complete message, a subscriber station basic capability complete message, and a registration complete message.

3. The method of claim 1,
wherein, when one of the first state functions is operated, the operating of the called state function comprises generating and transmitting a new message in response to the received message.

4. The method of claim 1,
wherein, when one of the first state functions is operated, the operating of the called state function comprises changing the current call state to another state.

5. The method of claim 4,
wherein, when one of the first state functions is operated, the operating of the called state function comprises operating a sensing timer of a changed call state.

6. A base station apparatus for controlling a call connection, the apparatus comprising:
a control subsystem for receiving a message, for calling a state function based on the received message and a state function matrix, and for operating the called state function,
wherein the state function matrix comprises a plurality of call states as one index among row and column indexes of the state function matrix, a plurality of messages as the other index of the state function matrix, and a plurality of elements of the state function matrix that each correspond to a respective call state among the plurality of call states and a respective message among the plurality of messages, each of the plurality of elements of the state function matrix corresponding to a state function to be operated when receiving a message among the plurality of messages in a call state among the plurality of call states, and
wherein the plurality of elements of the state function matrix includes a plurality of first state functions that are operated when receiving a message that is appropriate for a current call state and a plurality of second state functions that are operated when receiving no message that is appropriate for the current call state,
wherein the plurality of messages of the state function matrix includes a plurality of call connection messages and a message indicating non-receipt of a call connection message within a period of time, and
wherein the second state functions includes at least one of a function that is operated when receiving a message that is not expected in the current call state and a function that is operated when an expected message is not received before a predetermined time expires.

7. The apparatus of claim 6,
wherein the plurality of messages include at least one message among a ranging request message, a subscriber station basic capability request message, a registration request message, a ranging complete message, a subscriber station basic capability complete message, and a registration complete message.

8. The apparatus of claim 6,
wherein each of the plurality of first state functions generate a new message in response to the received message, and change the current call state to another call state.

9. The method of claim 1,
wherein each of the plurality of call states of the state function matrix is a call state where the control subsystem waits to receive a call connection message.

10. The apparatus of claim 6,
wherein each of the plurality of call states of the state function matrix is a call state where the control subsystem waits to receive a call connection message.

\* \* \* \* \*